May 13, 1924.

V. RIEDL

MOVABLE HEADLIGHT

Filed Oct. 13, 1922

Vladimer Riedl
INVENTOR

BY Victor J. Evans
ATTORNEY

WITNESS:

May 13, 1924.  
V. RIEDL  
1,493,704  
MOVABLE HEADLIGHT  
Filed Oct. 13, 1922  
2 Sheets-Sheet 2

Vladimer Riedl
INVENTOR
BY Victor J. Evans
ATTORNEY

Patented May 13, 1924.

1,493,704

UNITED STATES PATENT OFFICE.

VLADIMER RIEDL, OF OLMITZ, KANSAS.

MOVABLE HEADLIGHT.

Application filed October 13, 1922. Serial No. 594,345.

*To all whom it may concern:*

Be it known that I, VLADIMER RIEDL, a citizen of the United States, residing at Olmitz, in the county of Barton and State of Kansas, have invented new and useful Improvements in Movable Headlights, of which the following is a specification.

My present invention has reference to dirigible headlights for automobiles, and has for its object the provision of simple but effective means for swinging the headlights of an automobile in a vertical frame.

Other objects and advantages will present themselves as the nature of the invention is better understood, reference being had to the drawings which accompany and which form part of this application.

In the drawings:—

Figure 1:
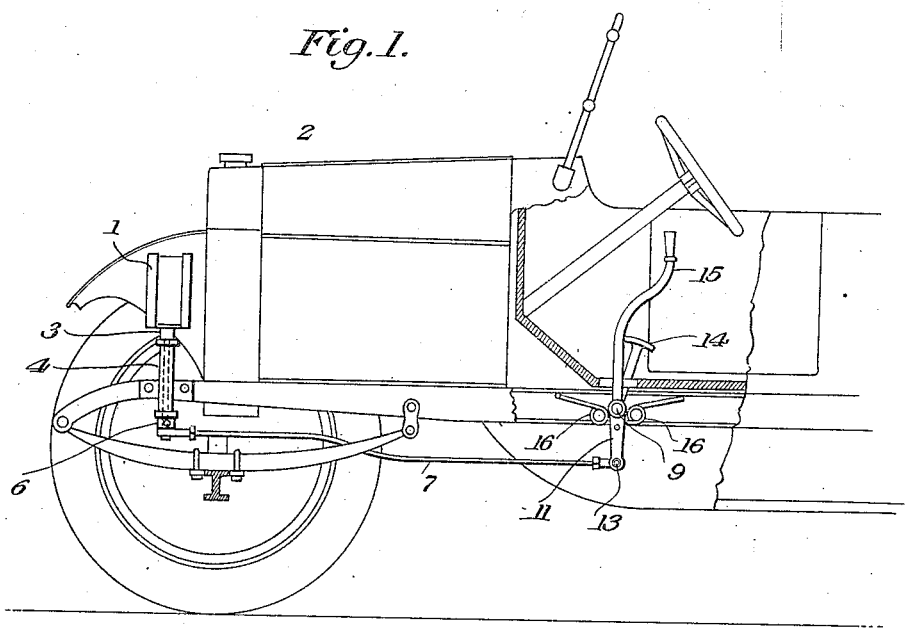
Figure 1 is a side elevation of a sufficient portion of an automobile to illustrate the application of the improvement thereon.
Figure 3:
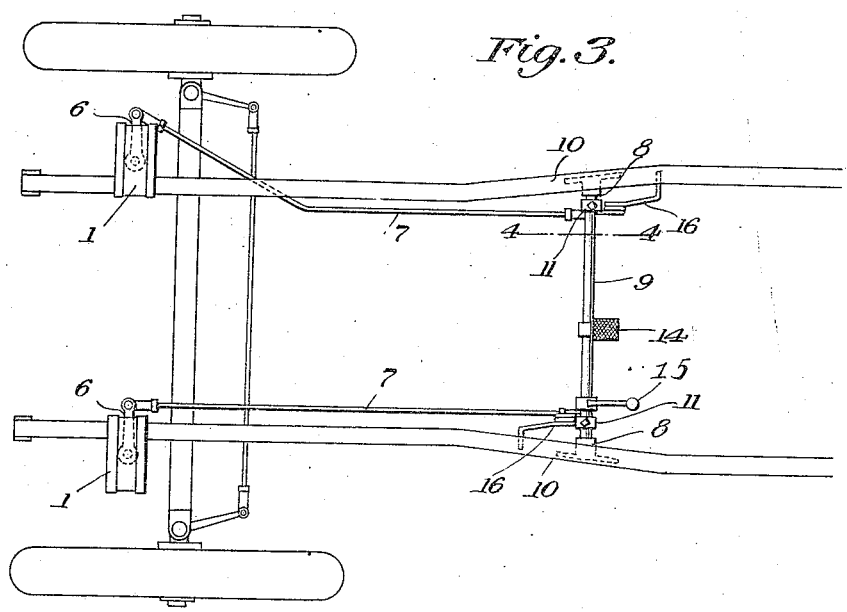
Figure 3 is a top plan view thereof.
Figure 2:
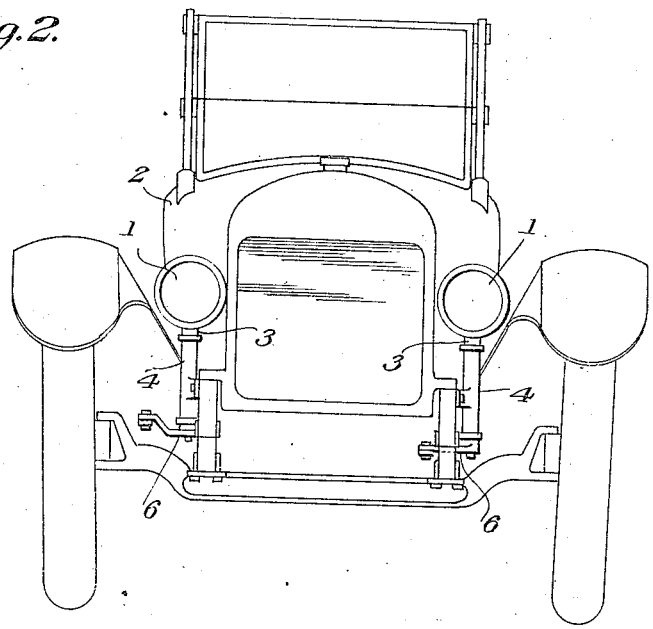
Figure 2 is a front elevation thereof.
Figure 4:
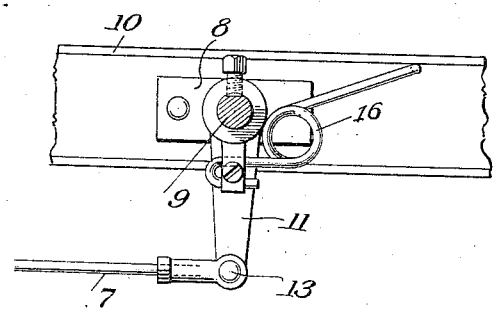
Figure 4 is a sectional view on the line 4—4 of Figure 3.

The headlights 1, for the automobile 2, are mounted upon the usual posts 3. Each post 3 is journaled for vertical support in a suitable bearing 4 on each side of the front end of the frame of the automobile 2. To the lower end of each post 3 there is an angle extension in the nature of a finger 6. The fingers on both posts are arranged in the same direction, and each of said fingers has loosely secured thereto a longitudinally extending rod 7.

Journaled in suitable bearings 8 below the floor boards at the front of the automobile there is a laterally arranged shaft 9. The bearings 8 for the shaft 9 may be and preferably are secured to the channeled side beams 10 of the frame of the automobile. The shaft 9 is provided with a pair of depending fingers 11 respectively, each of said fingers being provided with an opening that receives therethrough the offset ends of the rods 7 or headed pintles 13 secured to the said ends of the rods.

Securely connected to the shaft 9 and projecting through a suitable opening in the foot board at the front of the automobile there is a foot pedal 14 and a hand lever 15. Both the pedal and lever are disposed for convenient operation by the driver of the machine, and it will be apparent that a pressure upon either the pedal or lever will turn the shaft 9 to swing the fingers 11 and cause the rods 7 to influence the fingers 6 to turn the posts 3 and thereby swing the headlights 1 to any desired angle with respect to the automobile 2. Spring means 16 is provided for returning the parts to initial position, such means being preferably secured between the lever 15 and the dash of the automobile, but the same may, of course, be otherwise conveniently positioned.

Having described the invention, I claim:—

An apparatus of the class described, headlights, depending posts therefor, bearings in which the posts are journaled, offset fingers on the lower ends of the posts, rods loosely connected to said fingers, a shaft journaled in bearings transversely with respect to the rods, depending fingers on the shaft loosely connected to the rods, an operating pedal and lever for the shaft, spring means influencing the shaft to retain the headlights in normal position, said spring means including a depending perforated lug on said shaft adjacent each end thereof, a spring adjacent each end of said shaft, said springs having a coil intermediate their ends, and one end of each of said springs formed with a U-shaped part which is received in the depending lug adjacent which it is placed, a set screw carried by each lug and engaged between the legs of the U-shaped part to retain the same in the lug and the other end of each spring being extended laterally to engage an outstanding part of the motor vehicle frame.

In testimony whereof I affix my signature.

VLADIMER RIEDL.